United States Patent
Ueyama

(10) Patent No.: US 11,260,699 B2
(45) Date of Patent: Mar. 1, 2022

(54) TIRE

(71) Applicant: SUMITOMO RUBBER INDUSTRIES, LTD., Kobe (JP)

(72) Inventor: Kiyotaka Ueyama, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 535 days.

(21) Appl. No.: 15/921,900

(22) Filed: Mar. 15, 2018

(65) Prior Publication Data
US 2018/0264890 A1     Sep. 20, 2018

(30) Foreign Application Priority Data

Mar. 15, 2017 (JP) .............................. JP2017-050209

(51) Int. Cl.
*B60C 11/03* (2006.01)
*B60C 11/12* (2006.01)

(52) U.S. Cl.
CPC ...... *B60C 11/1204* (2013.01); *B60C 11/0302* (2013.01); *B60C 11/0304* (2013.01); *B60C 11/0306* (2013.01); *B60C 11/1259* (2013.01); *B60C 2011/0355* (2013.01); *B60C 2011/0367* (2013.01); *B60C 2011/0374* (2013.01); *B60C 2011/0376* (2013.01);
(Continued)

(58) Field of Classification Search
CPC ......... B60C 11/0306; B60C 2011/0358; B60C 2011/0367; B60C 19/001
See application file for complete search history.

(56) References Cited

U.S. PATENT DOCUMENTS 5,031,680 A * 7/1991 Kajikawa ................ B60C 11/14
152/209.18
5,088,536 A    2/1992 Graas et al.
(Continued)

FOREIGN PATENT DOCUMENTS

EP    3 162 594 A1    5/2017
JP    05-229310 A    9/1993
(Continued)

OTHER PUBLICATIONS

Extended European Search Report dated Jul. 10, 2018 in Patent Application No. 18160881.1, 10 pages.

*Primary Examiner* — Cedrick S Williams
(74) *Attorney, Agent, or Firm* — Oblon, McClelland, Maier & Neustadt, L.L.P.

(57) ABSTRACT

A tire includes a tread having main grooves linearly continuously extending in tire circumferential direction, and a first land portion formed between the main grooves. The first land portion has first transverse grooves such that each first transverse groove is extending inclined in first direction with respect to tire axial direction and completely across the first land portion, and first blocks formed between the first transverse grooves such that one or more first blocks have a first slot extending from first side surface of the first block on one side in the tire axial direction, a second slot extending from second side surface of the first block on the opposite side in the tire axial direction, a first sipe extending from the first slot and terminating within the first block, and a second sipe extending from the second slot and terminating within the first block without intersecting the first sipe.

20 Claims, 14 Drawing Sheets

(52) U.S. Cl.
CPC ............... *B60C 2011/0379* (2013.01); *B60C 2011/0381* (2013.01); *B60C 2011/0383* (2013.01); *B60C 2011/1254* (2013.01); *B60C 2200/04* (2013.01)

(56) References Cited

U.S. PATENT DOCUMENTS

| | | | |
|---|---|---|---|
| 5,871,598 A * | 2/1999 | Tomita | B60C 11/12 152/209.18 |
| 6,446,689 B1 | 9/2002 | Elkurd et al. | |
| 2011/0041972 A1 * | 2/2011 | Kageyama | B60C 11/0306 152/209.15 |
| 2012/0145295 A1 * | 6/2012 | Yamada | B60C 11/12 152/209.22 |
| 2014/0345767 A1 * | 11/2014 | Tanaka | B60C 11/1263 152/209.22 |
| 2016/0039248 A1 * | 2/2016 | Sueno | B60C 11/12 152/209.8 |
| 2016/0193886 A1 * | 7/2016 | Iwasaki | B60C 11/0306 152/209.24 |
| 2017/0057297 A1 * | 3/2017 | Takemori | B60C 11/12 |
| 2017/0120691 A1 | 5/2017 | Arai | |
| 2017/0136822 A1 * | 5/2017 | Takita | B60C 11/033 |

FOREIGN PATENT DOCUMENTS

| | | | | |
|---|---|---|---|---|
| JP | 2014180951 A | * | 9/2014 | |
| JP | 2015054602 A | * | 3/2015 | ......... B60C 11/0306 |
| JP | 6010589 B2 | * | 10/2016 | ......... B60C 11/0306 |

* cited by examiner

TIRE

CROSS-REFERENCE TO RELATED APPLICATIONS

The present application is based upon and claims the benefit of priority to Japanese Patent Application No. 2017-050209, filed Mar. 15, 2017, the entire contents of which are incorporated herein by reference.

BACKGROUND OF THE INVENTION

Field of the Invention

The present invention relates to a tire that allows excellent steering stability and performance on snow and ice to be achieved.

Description of Background Art

For example, Japanese Patent Laid-Open Publication No. HEI 5-229310 describes a tire that has a slot provided on a side surface of a block and a sipe extending from the slot. The entire contents of this publication are incorporated herein by reference.

SUMMARY OF THE INVENTION

According to one aspect of the present invention, a tire includes a tread part having main grooves each linearly continuously extending in a tire circumferential direction, and a first land portion formed between the main grooves. The first land portion has first transverse grooves such that each of the first transverse grooves is extending inclined in a first direction with respect to a tire axial direction and completely across the first land portion, and first blocks forming between the first transverse grooves such that at least one of the first blocks has a first slot extending from a first side surface of the one of the first blocks on one side in the tire axial direction, a second slot extending from a second side surface of the one of the first blocks on the opposite side in the tire axial direction, a first sipe extending from the first slot and terminating within the first block, and a second sipe extending from the second slot and terminating within the first block without intersecting the first sipe.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
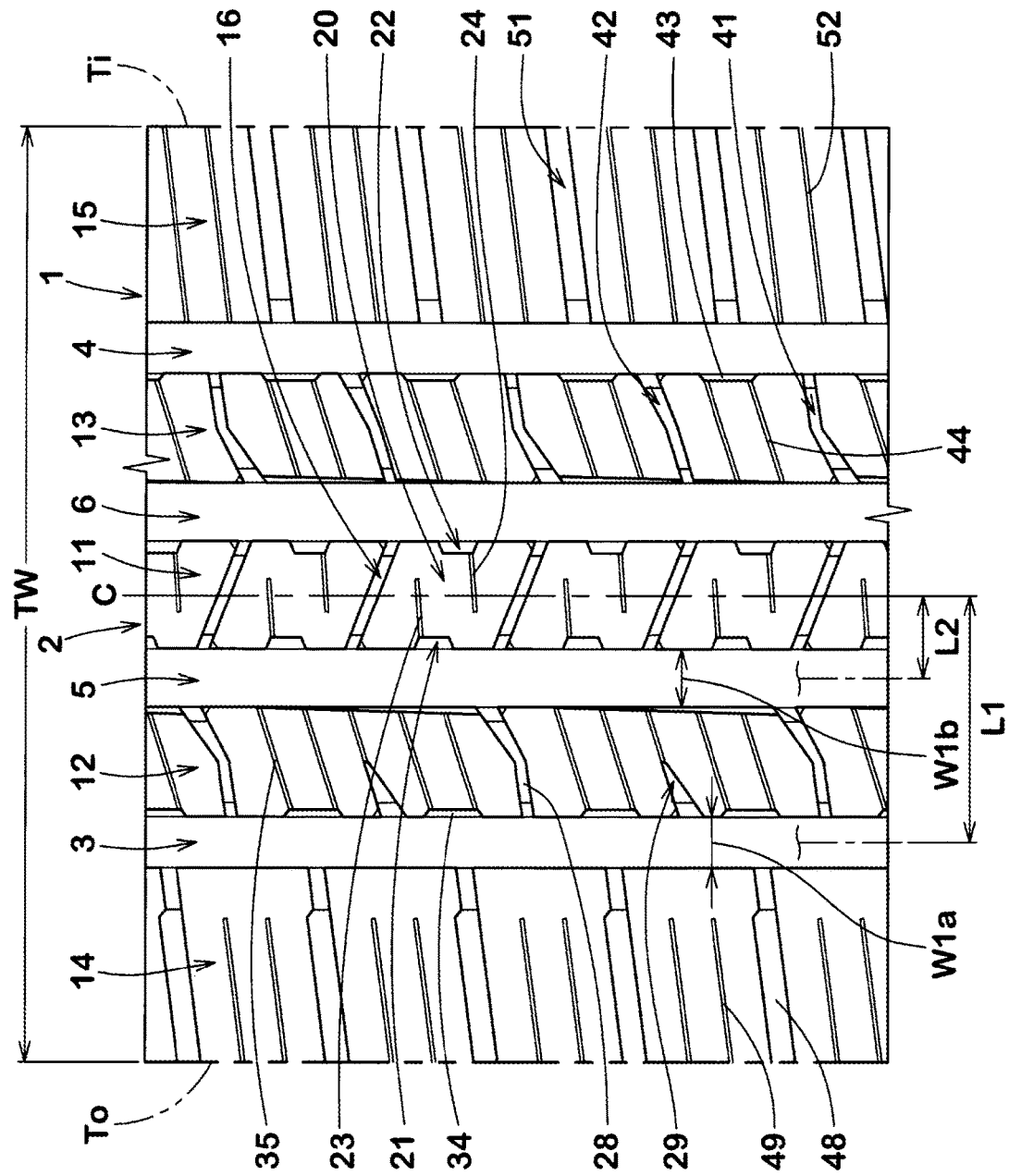
FIG. 1 is a developed view of a tread part of a tire according to an embodiment of the present invention.

Embodiments will now be described with reference to the accompanying drawings, wherein like reference numerals designate corresponding or identical elements throughout the various drawings.

FIG. 1 is a developed view of a tread part 2 of a tire 1 illustrating an embodiment of the present invention. The tire 1 of the present embodiment can be used, for example, for various tires such as a pneumatic tire for a passenger car or a vehicle for a heavy load, and for a non-pneumatic tire that is not filled with pressurized air. The tire 1 of the present embodiment can be suitably used, for example, as a winter tire for a passenger car.

As illustrated in FIG. 1, the tire 1 of the present embodiment has, for example, the tread part 2 in which a mounting orientation for mounting the tire 1 on a vehicle is specified. The tread part 2 has an outer-side tread edge (To), which is positioned on an outer side of a vehicle when the tire 1 is mounted on the vehicle, and an inner-side tread edge (Ti), which is positioned on an inner side of the vehicle when the tire 1 is mounted on the vehicle. The mounting orientation for mounting the tire 1 on a vehicle is displayed, for example, on a side wall part (not illustrated in the drawings) using a character or a symbol.

In the case of a pneumatic tire, the tread edges (To, Ti) are respectively tire axial direction outermost side ground contact positions when the tire 1 in a normal state is loaded with a normal load and is grounded on a flat surface at a camber angle of 0 degree. The term "normal state" refers to a state in which the tire is mounted to a normal rim and is filled with air at a normal internal pressure, and is not loaded. In the present specification, unless otherwise specified, values of dimensions and the like of the parts of the tire are values measured in the normal state.

The term "normal rim" refers to a rim for which standards are set for each tire in a system of standards that includes standards on which the tire is based. For example, the term "normal rim" refers to a "Standard Rim" in the JATMA standards, a "Design Rim" in the TRA standards, or a "Measuring Rim" in the ETRTO standards.

The term "normal internal pressure" refers to an air pressure for which standards are set for each tire in a system of standards that includes the standards on which the tire is based, and refers to a "Highest Air Pressure" in the JATMA standards, a maximum value published in the table "Tire Load Limits at Various Cold Inflation Pressures" in the TRA standards, or an "Inflation Pressure" in the ETRTO standards.

The term "normal load" refers to a load for which standards are set for each tire in a system of standards that includes the standards on which the tire is based, and refers to a "Maximum Load Capacity" in the JATMA standards, a maximum value published in the table "Tire Load Limits at Various Cold Inflation Pressures" in the TRA standards, or a "Load Capacity" in the ETRTO standards.

The tread part 2 has, for example, an asymmetric tread pattern with respect to a tire equator (C). In the tread part 2, multiple main grooves 10 that linearly continuously extending in a tire circumferential direction are provided. The multiple main grooves include, for example, an outer-side shoulder main groove 3, an inner-side shoulder main groove 4, an outer-side crown main groove 5, and an inner-side crown main groove 6.

The outer-side shoulder main groove 3 is provided, for example, on an outermost tread edge (To) side among the multiple main grooves. The inner-side shoulder main groove 4 is provided, for example, on an innermost tread edge (Ti) side among the multiple main grooves. The outer-side crown main groove 5 is provided, for example, between the outer-side shoulder main groove 3 and tire equator (C). The inner-side crown main groove 6 is provided, for example, between the inner-side shoulder main groove 4 and the tire equator (C).

A distance (L1) from the tire equator (C) to a groove center line of each of the outer-side shoulder main groove 3 and the inner-side shoulder main groove 4 is desirably, for example, 0.20-0.30 times a tread width (TW). A distance (L2) from the tire equator (C) to a groove center line of each of the outer-side crown main groove 5 and the inner-side crown main groove 6 is desirably, for example, 0.05-0.10 times the tread width (TW). The tread width (TW) is a tire axial direction distance from the outer-side tread edge (To) to the inner-side tread edge (Ti) in the normal state.

A groove width (W1a) of each of the outer-side shoulder main groove 3 and the inner-side shoulder main groove 4 and a groove width (W1b) of each of the outer-side crown main groove 5 and the inner-side crown main groove 6 are each desirably, for example, 3%-7% of the tread width (TW). The groove width (W1b) is desirably, for example, larger than the groove width (W1a). In the case where the tire is for a passenger car, the main grooves (3-6) desirably each have a groove depth of, for example, about 5-10 mm. However, the dimensions of the main grooves (3-6) are not limited to such ranges.

By providing the above-described main grooves (3-6), in the tread part 2, at least a first land portion 11 is formed. In a desirable mode, the first land portion 11 of the present embodiment is formed between the outer-side crown main groove 5 and the inner-side crown main groove 6. However, the first land portion 11 is not limited to such a position.

Figure 2:
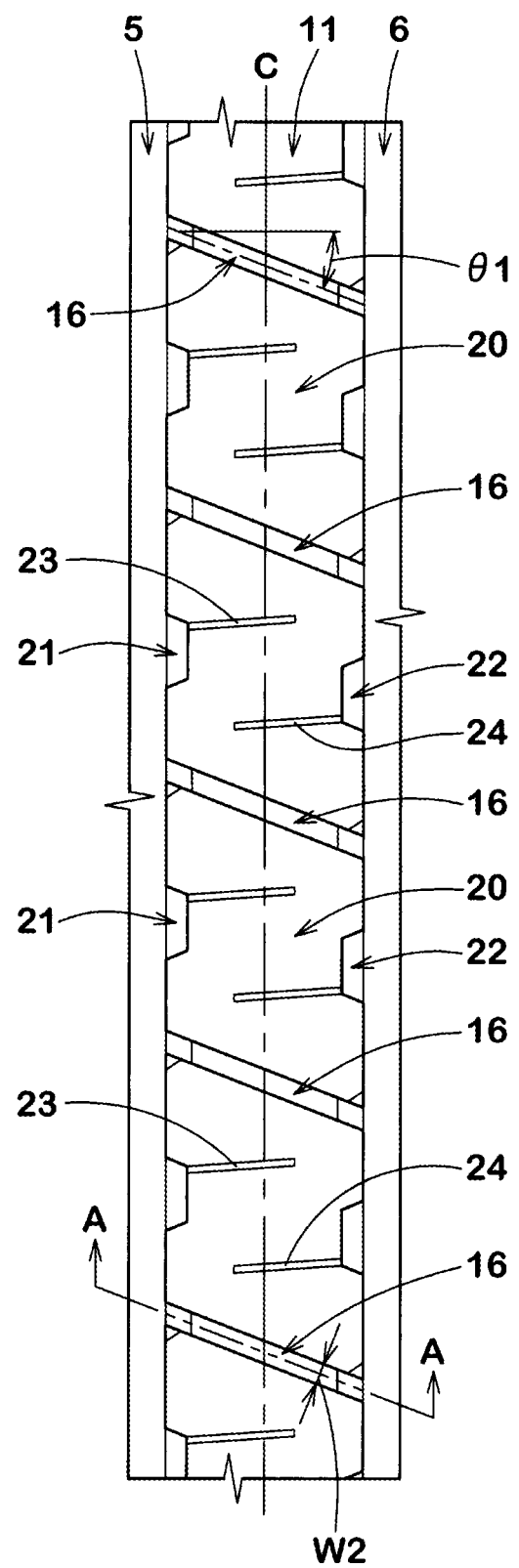
FIG. 2 is an enlarged view of a first land portion of FIG. 1.

FIG. 2 illustrates an enlarged view of the first land portion 11. As illustrated in FIG. 2, the first land portion 11 includes multiple first transverse grooves 16, and multiple first blocks 20 formed by dividing the first land portion 11 by the first transverse grooves 16.

The first transverse grooves 16 are each inclined in a first direction (which is downward to the right in each of the drawings of the present specification) with respect to the tire axial direction. Further, the first transverse grooves 16 each completely extend across the first land portion 11.

The first transverse grooves 16 of the present embodiment are each inclined, for example, at a constant angle. The first transverse grooves 16 are desirably each inclined, for example, at an angle (θ1) of 15-25 degrees with respect to the tire axial direction.

The first transverse grooves 16 each have, for example, a constant groove width in a length direction. The first transverse grooves 16 desirably each have, for example, a groove width (W2) of 0.10-0.30 times the groove width (W1b) (illustrated in FIG. 1) of the outer-side crown main groove 5.

Figure 3:
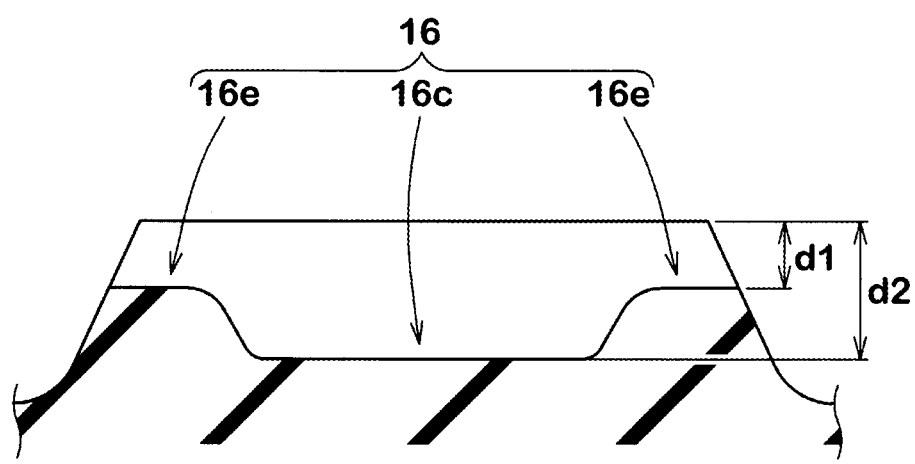
FIG. 3 is a cross-sectional view along a line A-A of FIG. 2.

FIG. 3 illustrates a cross-sectional view of one of the first transverse grooves 16 along an A-A line. As illustrated in FIG. 3, in each of the first transverse grooves 16, for example, a bottom surface is desirably raised at least at one tire axial direction end portion (16e). In each of the first transverse grooves 16 of the present embodiment, the bottom surface is raised at both tire axial direction end portions. As a result, in each of the first transverse grooves 16, the end portions (16e) desirably each have a depth (d1) smaller than that of a tire axial direction center portion (16c). The depth (d1) of each of the end portions (16e) is desirably, for example, 0.40-0.55 times the depth (d2) of the center portion (16c). Such first transverse grooves 16 can suppress deformation of the first land portion 11 in tire circumferential direction and thus can improve steering stability on a dry road surface.

Figure 4:
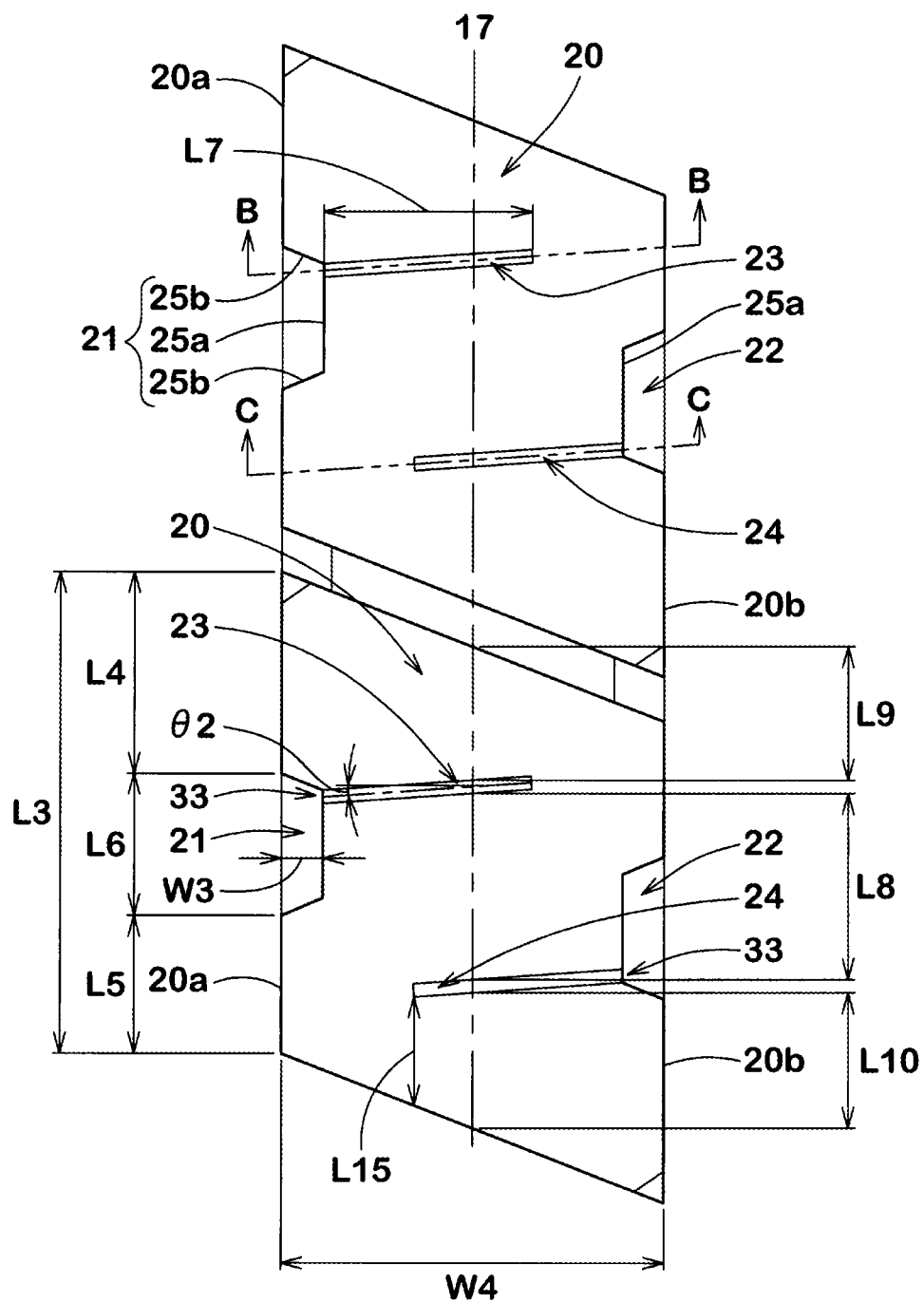
FIG. 4 is an enlarged view of a first block of FIG. 2.

FIG. 4 illustrates an enlarged view of the first blocks 20. As illustrated in FIG. 4, in at least one of the first blocks 20, a first slot 21, a second slot 22, a first sipe 23, and a second sipe 24 are provided. In the present specification, the term "slot" refers to a region in which a side surface of a land portion or a block has an edge on a tread surface side in a partially recessed recess and a length of the edge in a direction along the side surface is larger than a depth of the recess. The term "sipe" means a slit having a width of less than 1.5 mm.

The first slot 21 extends from a first side surface (20a) on one side in the tire axial direction of the first block 20. The second slot 22 extends from a second side surface (20b) on the other side in the tire axial direction. In the present embodiment, the first side surface (20a) is a side surface on the outer-side crown main groove 5 side, and the second side surface (20b) is a side surface on the inner-side crown main groove 6 side. The slots (21, 22) each include, for example, a longitudinal edge (25a) that extends along the tire circumferential direction, a pair of transverse edges (25b) that respectively extend from ends of the longitudinal edge (25a) toward a main groove side, and corners 33 that connect the longitudinal edge (25a) and the transverse edges (25b).

The first sipe 23 extends from the first slot 21 and terminates within the first block 20. The second sipe 24 extends from the second slot 22 and terminates within the first block 20 without intersecting the first sipe 23.

In the tire 1 according to an embodiment of the present invention, the slots (21, 22) can strongly compress snow and achieve a large snow column shearing force. Further, since the sipes respectively extend from the slots (21, 22), the slots (21, 22) appropriately deform during running of the tire and snow in the slots (21, 22) is promptly discharged to the outside of the tire. Therefore, the above-described effect can be maintained over a long period of time. In the present embodiment, since the first land portion 11 is formed between the outer-side crown main groove 5 and the inner-side crown main groove 6, a large ground contact pressure tends to act on the first land portion 11, and a higher effect can be expected.

The first sipe 23 and the second sipe 24 respectively extend from the slots and thus are easier to open than ordinary sipes, and, for example, a whole edge of each of the sipes tends to be in close contact with a road surface according to unevenness of the road surface. Therefore, a tire according to an embodiment of the present invention can expect a high frictional force due to the edges of the sipes (23, 24), for example, on a road surface where snow has been strongly compressed or on an icy road surface. Further, the first sipe 23 and the second sipe 24 terminate within the first block 20 without intersecting each other. Therefore, a decrease in rigidity of the first block 20 is suppressed and excellent steering stability is obtained.

More detailed structures of the slots (21, 22) and the sipes (23, 24) are described. The first slot 21 is desirably provided, for example, at a position including a tire circumferential direction center position of the first side surface (20a). For the first slot 21 of the present embodiment, for example, a distance (L4) from one end of the first side surface (20a) to the first slot 21 and a distance (L5) from the other end of the first side surface (20a) to the first slot 21 are desirably respectively 0.25-0.40 times a tire circumferential direction length (L3) of the first side surface (20a). Such a first slot 21 is sufficiently far from the ends of the first side surface (20a) and thus is difficult to deform and can sufficiently compress snow.

For example, on the tread surface, a tire circumferential direction width of the first slot 21 is desirably gradually decreased toward a center of the block. Such a first slot 21 can easily discharge compressed snow.

The first slot 21 desirably has, for example, a tire circumferential direction length (L6) of 0.25-0.35 times the tire circumferential direction length (L3) of the first side surface (20a). Such a first slot 21 helps to improve performance on ice and snow while preventing a decrease in rigidity of the block.

From the same point of view, the first slot 21 desirably has, for example, a tire axial direction width (W3) of 0.05-0.15 times a tire axial direction width (W4) of the first block 20.

The second slot 22 of the present embodiment has, for example, the same structure as the first slot 21, and the structure of the first slot 21 described above can be applied.

Figure 5A:
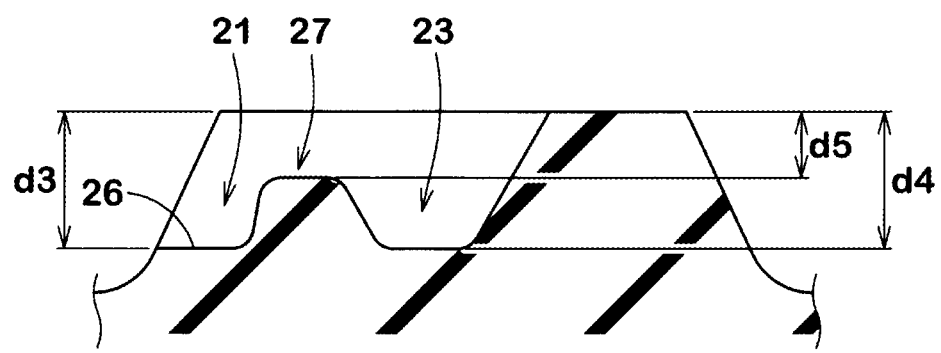
FIG. 5A is a cross-sectional view along a B-B line of FIG. 4.
Figure 5B:
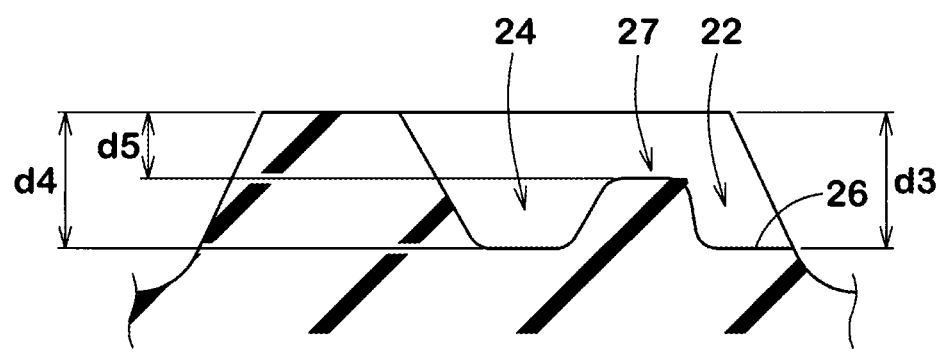
FIG. 5B is a cross-sectional view along a C-C line of FIG. 4.

FIG. 5A illustrates a cross-sectional view along a B-B line passing through the first slot 21 and the first sipe 23. FIG. 5B illustrates a cross-sectional view along a C-C line passing through the second slot 22 and the second sipe 24. As illustrated in FIGS. 5A and 5B, the first slot 21 and the second slot 22 desirably each have, for example, a bottom surface 26 having a tire axial direction width. Such slots (21, 22) can capture a lot of snow inside.

In order to improve the performance on snow and ice, the first slot 21 and the second slot 22 desirably each have a depth (d3) larger than that of the end portions (16e) (illustrated in FIG. 3) of the first transverse grooves 16. The depth (d3) of the first slot 21 and the second slot 22 is desirably, for example, 1.5-2.5 times the depth (d1) of the end portions (16e) of the first transverse grooves 16.

As illustrated in FIG. 4, the first sipe 23 is connected, for example, to the corner 33 on one side (the upper side in FIG. 4) in the tire circumferential direction of the first slot 21. The second sipe 24 is connected, for example, to the corner 33 on the other side (the lower side in FIG. 4) in the tire circumferential direction of the second slot 22.

The first sipe 23 and the second sipe 24 each linearly extend. The first sipe 23 and the second sipe 24 of the present embodiment are desirably each inclined in a second direction (which is upward to the right in each of the drawings of the present specification) opposite to the first direction with respect to the tire axial direction. As a result, a frictional force in a direction different from that of the first transverse grooves 16 can be expected. In a desirable mode, the first sipe 23 and the second sipe 24 extend parallel to each other. Such first sipe 23 and second sipe 24 allow rigidity distribution of the block to become uniform and partial deformation of the block to be suppressed. This helps to improve the steering stability on a dry road surface.

The first sipe 23 and the second sipe 24 are desirably each inclined, for example, at an angle ($\theta2$) smaller than that of the first transverse grooves 16 with respect to the tire axial direction. The angle ($\theta2$) is desirably, for example, 5-10 degrees. Such first sipe 23 and second sipe 24, together with the first transverse grooves 16, can improve traction while suppressing lateral drift of the vehicle on snow and ice.

The first sipe 23 and the second sipe 24 desirably each extend across a center line 17 that bisects a tire axial direction width of the first block 20. A tire axial direction length (L7) of each of the first sipe 23 and the second sipe 24 is preferably, for example, 0.30-0.70 times, and more preferably 0.40-0.60 times the tire axial direction width (W4) of the first block 20. Such first sipe 23 and second sipe 24 can improve the performance on snow and ice while maintaining the rigidity of the block.

A tire circumferential direction shortest distance (L15) from an end of the first sipe 23 or the second sipe 24 to a first transverse groove 16 is desirably, for example, 5-15 mm. As a result, the rigidity distribution of the first blocks 20 can become appropriate, and the steering stability on a dry road surface and the performance on snow and ice can be improved in a well-balanced manner.

On the center line 17, a distance (L8) between the first sipe 23 and the second sipe 24 is desirably larger than a distance (L9) between the first sipe 23 and a nearest neighboring first transverse groove 16 of the first sipe 23, and larger than a distance (L10) between the second sipe 24 and a nearest neighboring first transverse groove 16 of the second sipe 24. In a more desirable mode, the distance (L8) is desirably 1.35-1.55 times the larger one of the distance (L9) and the distance (L10). Such an arrangement of the first sipe 23 and the second sipe 24 allows a large rigidity of a center portion of the block to be maintained and thus allows an excellent steering stability to be achieved.

As illustrated in FIGS. 5A and 5B, in order to improve the steering stability on a dry road surface and the performance on snow and ice in a well-balanced manner, the first sipe 23 and the second sipe 24 desirably each have a maximum depth (d4) of 0.50-0.80 times that of the main grooves.

For each of the first sipe 23 and the second sipe 24, a bottom surface is desirably raised at an end portion 27 on the slot side. The end portion 27 desirably has a depth (d5), for example, of 0.40-0.60 times the maximum depth (d4) of the sipe. In a more desirable mode, the depth (d5) of the end portion 27 is, for example, smaller than the depth of the slots (21, 22). Such first sipe 23 and second sipe 24 can improve the performance on snow and ice while maintaining the rigidity of the block.

As illustrated in FIG. 1, in the tread part 2, second-fifth land portions (12-15) are further forming. In the present embodiment, the second land portion 12 is formed between the outer-side crown main groove 5 and the outer-side shoulder main groove 3. The third land portion 13 is formed between the inner-side crown main groove 6 and the inner-side shoulder main groove 4. The fourth land portion 14 is formed between the outer-side shoulder main groove 3 and the outer-side tread edge (To). The fifth land portion 15 is formed between the inner-side shoulder main groove 4 and the inner-side tread edge (Ti).

Figure 6:
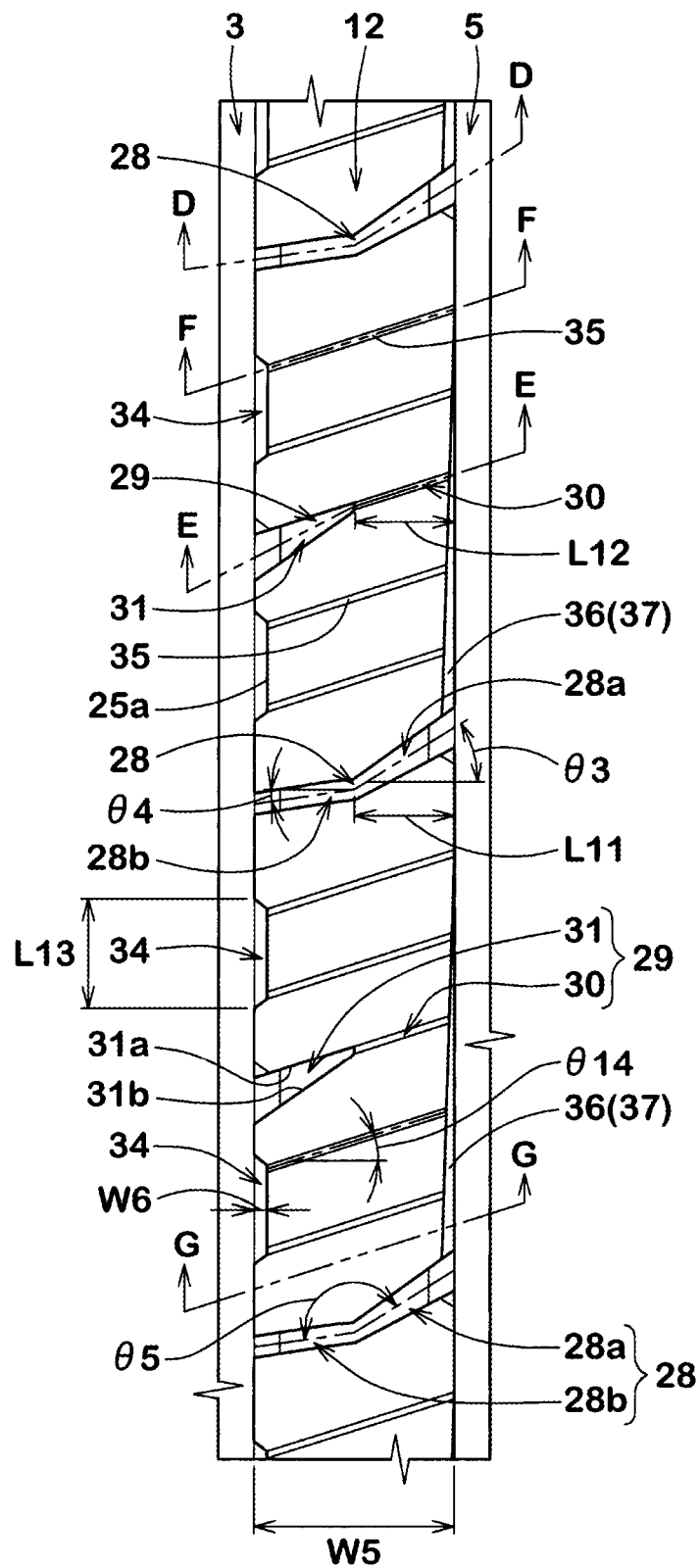
FIG. 6 is an enlarged view of a second land portion of FIG. 1.

FIG. 6 illustrates an enlarged view of the second land portion 12. As illustrated in FIG. 6, in the second land portion 12, for example, multiple second transverse grooves 28 and multiple third transverse grooves 29, each completely extending across the second land portion 12, are provided.

The second transverse grooves 28 are desirably each bent, for example, in a V shape. Such second transverse grooves 28 can increase frictional forces in multiple directions with their edges. Further, the second transverse grooves 28 each bent in a V shape can strongly compress snow near their apexes and thus allow a large snow column shearing force to be expected.

The second transverse grooves 28 each include, for example, a first portion (28a) and a second portion (28b) that are each inclined at mutually different angles.

The first portion (28a) extends, for example, from the outer-side crown main groove 5 toward the outer-side shoulder main groove 3 side. The first portion (28a) desirably has a tire axial direction length (L11) of, for example, 0.40-0.60 times a tire axial direction width (W5) of the second land portion 12.

The first portion (28a) is inclined, for example, in a second direction with respect to the tire axial direction. An angle ($\theta 3$) of the first portion (28a) with respect to the tire axial direction is desirably, for example, 30-40 degrees.

In a more desirable mode, the first portion (28a) desirably has a groove width that is gradually decreased from the outer-side crown main groove 5 toward the outer-side shoulder main groove 3 side. Such a first portion (28a) allows snow to be positively discharged when the groove is closed during running on snow.

The second portion (28b), for example, is connected to the first portion (28a) and extends to the outer-side shoulder main groove 3. The second portion (28b) is inclined, for example, in a second direction with respect to the tire axial direction. The second portion (28b) is desirably inclined, for example, at an angle ($\theta 4$) smaller than that of the first portion (28a). The angle ($\theta 4$) is desirably, for example, 5-10 degrees. As a result, the second transverse grooves 28 desirably each have, for example, a bending angle ($\theta 5$) of 150-160 degrees.

The second portion (28b) in the present embodiment desirably extends, for example, with a constant groove width. Such a second portion (28b) can prevent the first portion (28a) from being excessively opened and thus can suppress uneven wear of the second land portion 12.

Figure 7A:
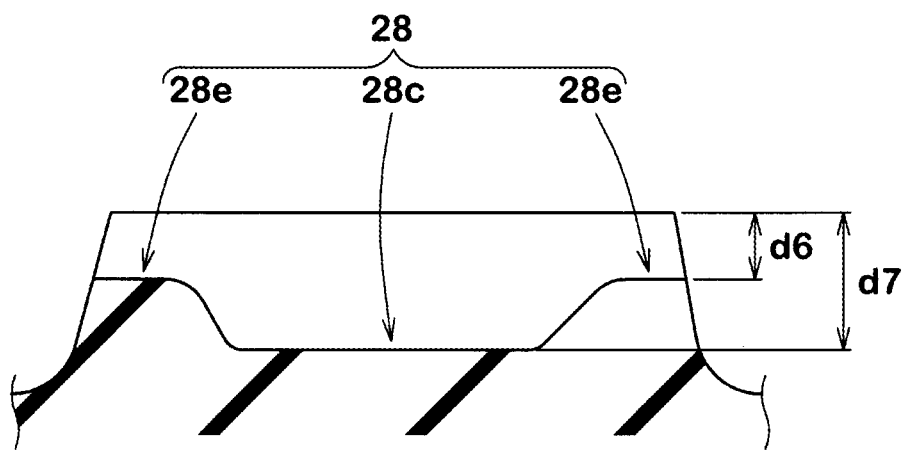
FIG. 7A is a cross-sectional view along a D-D line of FIG. 6.

FIG. 7A illustrates a cross-sectional view of one of the second transverse grooves 28 along a D-D line. As illustrated in FIG. 7A, in each of the second transverse grooves 28, a bottom surface is desirably raised at least at one tire axial direction end portion (28e). In the present embodiment, the bottom surface is raised at both tire axial direction end portions of each of the second transverse grooves 28. A depth (d6) of each of the end portions (28e) is desirably, for example, 0.40-0.60 times a depth (d7) of a center portion (28c) of each of the second transverse grooves 28.

As illustrated in FIG. 6, the third transverse grooves 29 are desirably each inclined, for example, in a second direction with respect to the tire axial direction. The third transverse grooves 29 of the present embodiment each include, for example, a constant width portion 30 and a widened portion 31.

The constant width portion 30 extends, for example, with a constant groove width. The constant width portion 30 may be structured, for example, as a sipe having a width of less than 1.5 mm. The constant width portion 30 of the present embodiment extends, for example, from the outer-side crown main groove 5 toward the outer-side shoulder main groove 3 side. The constant width portion 30 desirably has a tire axial direction length (L12) of, for example, 0.40-0.60 times the tire axial direction width (W5) of the second land portion 12.

The widened portion 31, for example, is connected to the constant width portion 30 and extends to the outer-side shoulder main groove 3. The widened portion 31 desirably has, for example, a groove width that is gradually increased toward an end on the outer-side shoulder main groove 3 side of the third transverse groove 29. The widened portion 31 of the present embodiment has a first groove edge (31a) that linearly extends at the same angle as a groove edge of the constant width portion 30 with respect to the tire axial direction, and a second groove edge (31b) that linearly extends inclined at an angle larger than that of the first groove edge (31a) with respect to the tire axial direction.

Figure 7B:
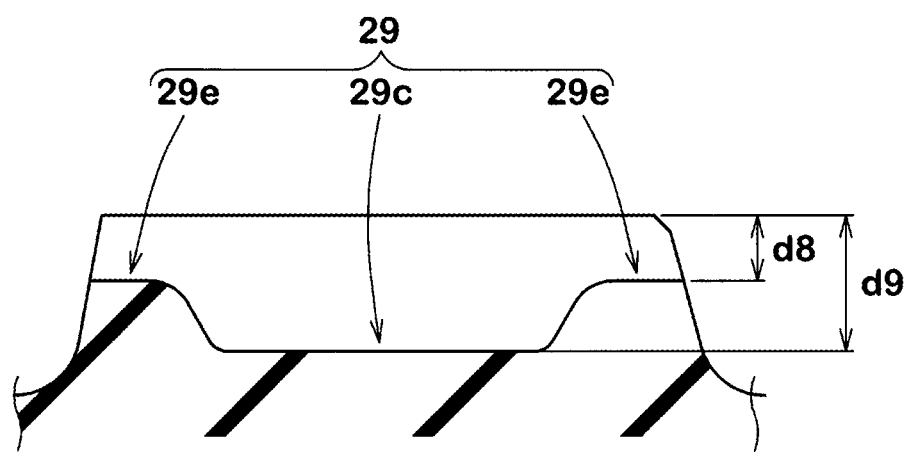
FIG. 7B is a cross-sectional view along an E-E line of FIG. 6.

FIG. 7B illustrates a cross-sectional view of one of the third transverse grooves 29 along an E-E line. As illustrated in FIG. 7B, in each of the third transverse grooves 29, for example, a bottom surface is desirably raised at least at one tire axial direction end portion (29e). In a more desirable mode, the bottom surface is raised at both tire axial direction end portions of each of the third transverse grooves 29. A depth (86) of each of the end portions (29e) is desirably, for example, 0.40-0.60 times a depth (d9) of a tire axial direction center portion (29c) of each of the third transverse grooves 29. Such third transverse grooves 29 can improve the steering stability on a dry road surface and the performance on snow and ice in a well-balanced manner.

As illustrated in FIG. 6, in the second land portion 12, third slots 34 and third sipes 35 are further provided.

The third slots 34 each extend, for example, from a side surface on the outer-side crown main groove 3 side of the second land portion 12. The third slots 34 of the present embodiment each have, for example, a tire circumferential direction length (L13) larger than that of each of the first slots 21 (illustrated in FIG. 4; the same applies hereinafter). The length (L13) of each of the third slots 34 is desirably, for example, 1.4-1.6 times the tire circumferential direction length (L6) of each of the first slots 21.

The third slots 34 each have, for example, a tire axial direction width (W6) smaller than that of each of the first slots 21. The width (W6) of each of the third slots 34 is desirably, for example, 0.50-0.80 times the tire axial direction width (W3) of each of the first slots 21. Such third slots 34 have less clogging of now than the first slots 21. Therefore, the performance on snow and ice can be maintained over a long period of time.

The third sipes 35 each linearly extend inclined, for example, in a second direction with respect to the tire axial direction. The third sipes 35 are each inclined, for example, at an angle ($\theta 14$) of 10-25 degrees with respect to the tire axial direction. In a desirable mode, the third sipes 35 are each arranged parallel to the constant width portion 30 of each of the third transverse grooves 29.

The third sipes 35 desirably each extend, for example, from a third slot 34 to the outer-side crown main groove 5. In the present embodiment, a third sipe 35 extends from each end portion of a longitudinal edge (25a) of each of the third slots 34. Such third sipes 35 allow high traction due to their edges to be expected.

Figure 8A:
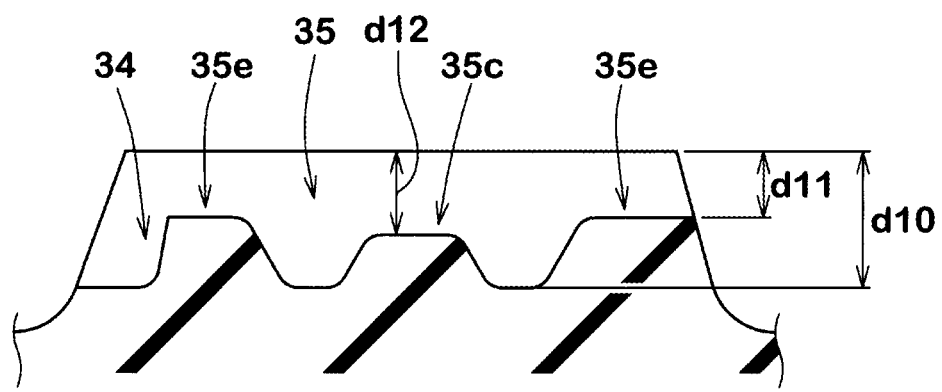
FIG. 8A is a cross-sectional view along an F-F line of FIG. 6.

FIG. 8A illustrates a cross-sectional view of one of the third sipes 35 along an F-F line. As illustrated in FIG. 8A, in each of the third sipes 35, a bottom surface is desirably raised at both tire axial direction end portions. The end portions of each of the third sipes 35 desirably each have a depth (d11) of, for example, 0.40-0.60 times a maximum depth (d10) of the third sipes 35.

Figure 8B:
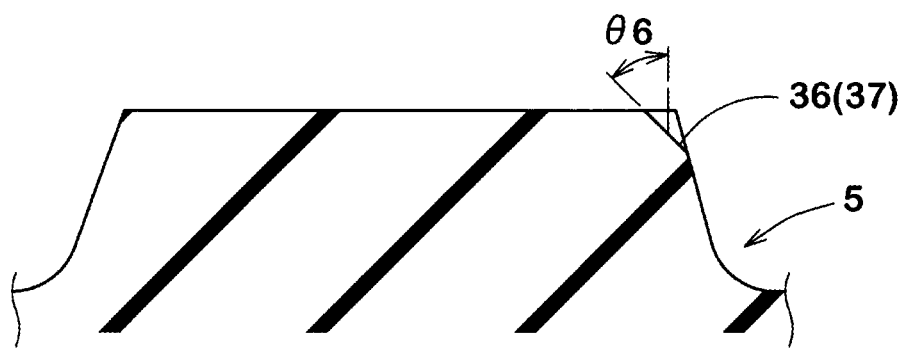
FIG. 8B is a cross-sectional view along a G-G line of FIG. 6.

In each of the third sipes 35, the bottom surface is desirably also raised at a tire axial direction center portion (35c). The center portion (35c) of each of the third sipes 35 desirably has a depth (d12) of, for example, 0.40-0.60 times the maximum depth (d10) of the third sipes 35. In a more desirable mode, the depth (d12) of the center portion (35c) of each of the third sipes 35 is desirably, for example, larger than the depth (d11) of the two end portions. As a result, the rigidity of the second land portion 12 can be maintained, and an excellent steering stability on a dry road surface can be obtained. As illustrated in FIG. 6, in the second land portion 12 of the present embodiment, for example, chamfered portions 36 are desirably provided on the outer-side crown main groove 5 side. FIG. 8B illustrates a cross-sectional view of one of the chamfered portions 36 along a G-G line. As illustrated in FIG. 8B, the chamfered portions 36 are each structured as an inclined surface 37 arranged between a tread surface of the land portion and a side surface of the land portion on the outer-side crown main groove 5 side. The inclined surface 37 is inclined, for example, at an angle (θ6) of 40-50 degrees with respect to the tire radial direction.

As illustrated in FIG. 6, the chamfered portions 36 each extend, for example, from the first portion (28a) of a second transverse groove 28 to one side in the tire circumferential direction (the upper side in FIG. 6). In a desirable mode, for each of the chamfered portions 36, the inclined surface 37 has a width that is gradually decreased toward the one side in the tire circumferential direction. Such chamfered portions 36 help to suppress uneven wear of the second land portion 12.

Figure 9:
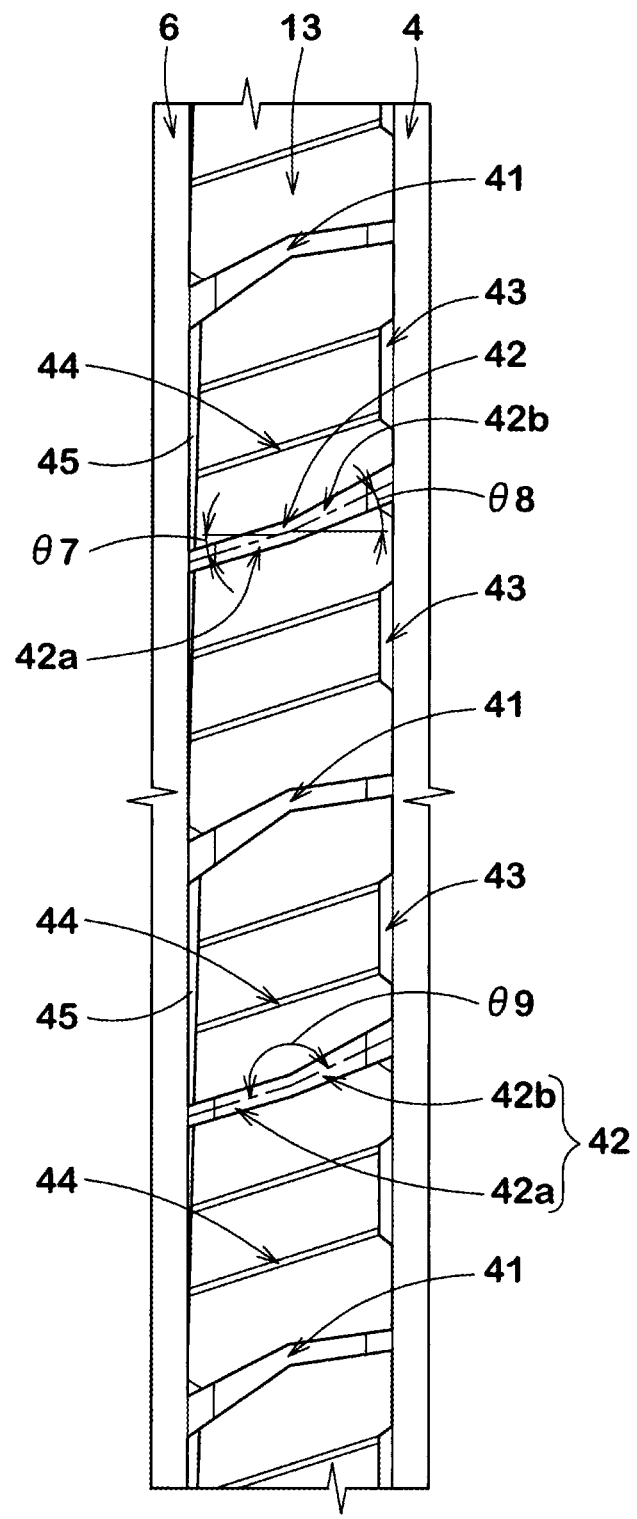
FIG. 9 is an enlarged view of a third land portion 13 of FIG. 1.

FIG. 9 illustrates an enlarged view of the third land portion 13. As illustrated in FIG. 9, in the third land portion 13, for example, multiple fourth transverse grooves 41 and multiple fifth transverse grooves 42, each completely extending across the third land portion 13, are provided. The fourth transverse grooves 41 and the fifth transverse grooves 42 are desirably each inclined, for example, in a second direction with respect to the tire axial direction.

The fourth transverse grooves 41 are desirably each bent, for example, in a V shape that is convex toward one side in the tire circumferential direction (the upper side in FIG. 9). The fourth transverse grooves 41 of the present embodiment each have a shape of a reversed second transverse groove 28. The fourth transverse grooves 41 each have, for example, substantially the same structure as each of the second transverse grooves 28, and the above-described structure of each of the second transverse grooves 28 can be applied.

The fifth transverse grooves 42 are desirably each bent, for example, in a V shape that is convex toward the other side in the tire circumferential direction (the lower side in FIG. 9). Such fifth transverse grooves 42, together with the fourth transverse grooves 41, can increase frictional forces in multiple directions with their edges.

The fifth transverse grooves 42 each include, for example, a first portion (42a) and a second portion (42b). The first portion (42a) extends, for example, from the inner-side crown main groove 6 at an angle (θ7) of 15-25 degrees with respect to the tire axial direction. The second portion (42b) is connected to the first portion (42a), and extends to the inner-side shoulder main groove 4 and is inclined at an angle (θ8) larger than that of the first portion (42a) with respect to the tire axial direction. The angle (θ8) of the second portion (42b) is desirably, for example, 20-30 degrees. As a result, the fifth transverse grooves 42 each have a bending angle (θ9) larger than that of each of the fourth transverse grooves 41. The bending angle (θ9) of each of the fifth transverse grooves 42 of the present embodiment is, for example, 165-175 degrees.

In a more desirable mode, the second portion (42b) of each of the fifth transverse grooves 42 desirably has a groove width that is gradually increased toward the inner-side shoulder main groove 4 side. Such fifth transverse grooves 42 allow snow to be positively discharged when the grooves are closed during running on snow.

The fifth transverse grooves 42 each have, for example, substantially the same transverse cross section as each of the second transverse grooves 28. That is, in each of the fifth transverse grooves 42, for example, a bottom surface is desirably raised at both tire axial direction end portions (not illustrated in the drawings).

In the third land portion 13, fourth slots 43, fourth sipes 44, and chamfered portions 45 are further provided.

The fourth slots 43 each extend, for example, from a side surface on the inner-side shoulder main groove 4 side of the third land portion 13. The fourth slots 43 of the present embodiment each have, for example, substantially the same structure as each of the third slots 34 provided in the second land portion 12, and the above-described structure of each of the third slots 34 can be applied.

The fourth sipes 44 each extend, for example, from a fourth slot 43 to the inner-side crown main groove 6. The fourth sipes 44 of the present embodiment each have, for example, substantially the same structure as each of the third sipes 35 provided in the second land portion 12, and the above-described structure of each of the third sipes 35 can be applied.

The chamfered portions 45 are provided, for example, on the inner-side crown main groove 6 side. The chamfered portions 45 of the third land portion 13 each have substantially the same structure as each of the chamfered portions 36 of the second land portion 12, and the above-described structure of each of the chamfered portions 36 can be applied. However, for each of the chamfered portions 45 of the third land portion 13, an inclined surface has a width that is gradually decreased toward a side (the lower side in FIG. 9) opposite to that in the case of the chamfered portions 36.

Figure 10:
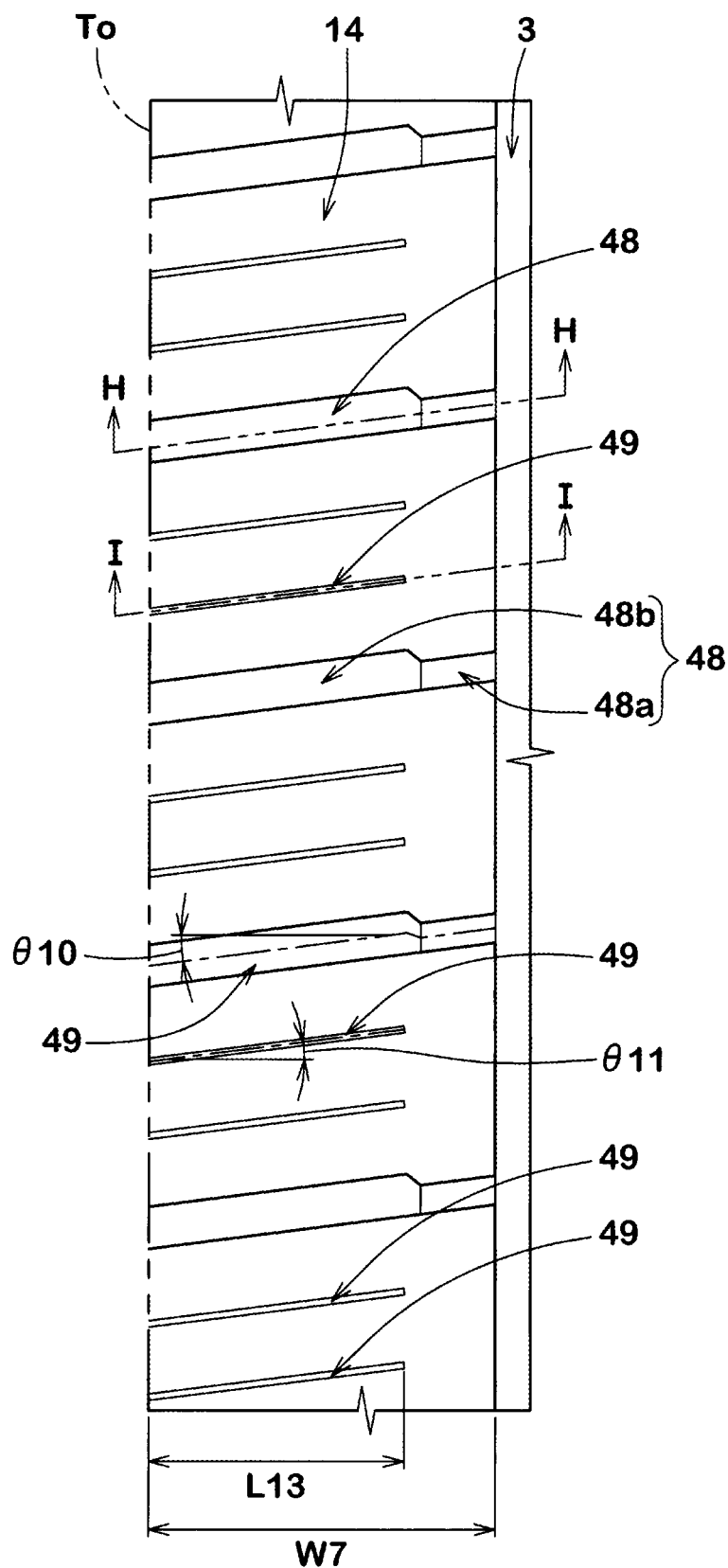
FIG. 10 is an enlarged view of a fourth land portion 14 of FIG. 1.

FIG. 10 illustrates an enlarged view of the fourth land portion 14. As illustrated in FIG. 10, in the fourth land portion 10, multiple sixth transverse grooves 48 and multiple fifth sipes 49 are provided.

Each of the sixth transverse grooves 48 extends, for example, from the outer-side shoulder main groove 3 to the outer-side tread edge (To). The sixth transverse grooves 48 each linearly extend inclined, for example, in a second direction with respect to the tire axial direction. The sixth transverse grooves 48 are desirably each inclined, for example, at an angle (θ10) of 5-15 degrees with respect to the tire axial direction. Such sixth transverse grooves 48 also exert a frictional force in the tire axial direction and can suppress lateral drift of the tire running on snow and ice.

The sixth transverse grooves 48 desirably each include, for example, a narrow portion (48a) and a wide portion (48b). The narrow portion (48a) extends, for example, from the outer-side shoulder main groove 3 toward the outer-side tread edge (To) side. The wide portion (48b) has, for example, a groove width larger than that of the narrow portion (48a). The wide portion (48b), for example, is connected to a tire axial direction outer side of the narrow portion (48a) and extends to the outer-side tread edge (To).

Figure 11A:
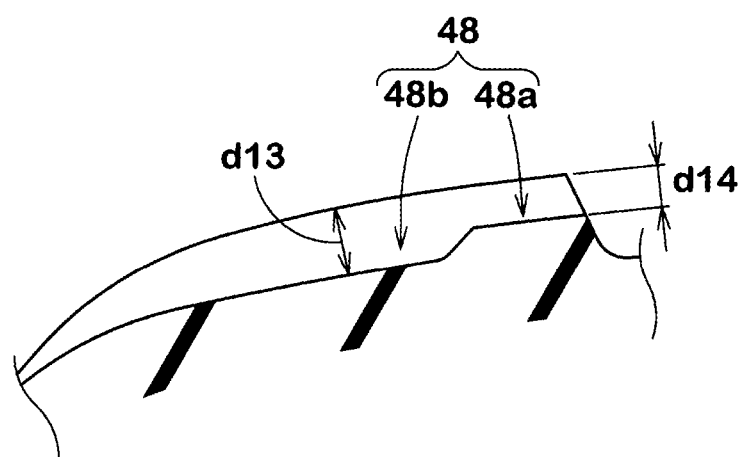
FIG. 11A is a cross-sectional view along a H-H line of FIG. 10.

FIG. 11A illustrates a cross-sectional view of one of the sixth transverse grooves 48 along an H-H line. As illustrated in FIG. 11A, in the narrow portion (48a) of each of the sixth transverse grooves 48, for example, a bottom surface is desirably raised. The narrow portion (48a) desirably has a depth (d14), for example, of 0.60-0.80 times a maximum depth (d13) of the sixth transverse grooves 48. Such a narrow portion (48a) helps to improve the steering stability on a dry road surface.

As illustrated in FIG. 10, the fifth sipes 49 are each provided, for example, between sixth transverse grooves 48 that are adjacent to each other in the tire circumferential direction. In the present embodiment, multiple fifth sipes 49 are provided between the sixth transverse grooves 48.

The fifth sipes 49 each extend, for example, from the outer-side tread edge (To) toward the outer-side shoulder main groove 3 side and terminate within the fourth land portion 14. The fifth sipes 49 desirably each have a tire axial direction length (L14) of, for example, 0.70-0.80 times tire axial direction width (W7) of the fourth land portion 14. Such fifth sipes 49, together with the sixth transverse grooves 48, increase rigidity of the fourth land portion 14 on a tire axial direction inner side. This can improve the steering stability on a dry road surface and suppress uneven wear of the fourth land portion 14.

The fifth sipes 49 are each inclined, for example, in a second direction with respect to the tire axial direction. The fifth sipes 49 are desirably each inclined, for example, at an angle (θ11) of 5-15 degrees with respect to the tire axial direction. In desirable mode, the fifth sipes 49 are arranged, for example, parallel to the sixth transverse grooves 48.

Figure 11B:
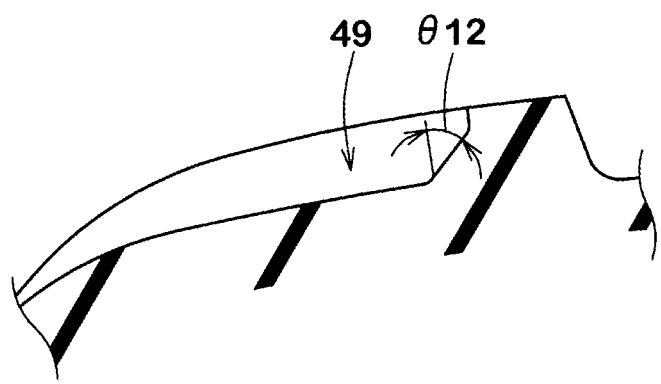
FIG. 11B is a cross-sectional view along an I-I line of FIG. 10.

FIG. 11B illustrates a cross-sectional view of one of the fifth sipes 49 along an I-I line. As illustrated in FIG. 11B, in each of the fifth sipes 49, for example, a bottom surface of a tire axial direction inner end portion is inclined at an angle (θ12) of 40-50 degrees with respect to a normal line orthogonal to the tread surface. Such fifth sipes 49 allow the rigidity of the land portion to smoothly vary near the inner end portions fifth sipes 49 and can suppress uneven wear of the land portion.

Figure 12:
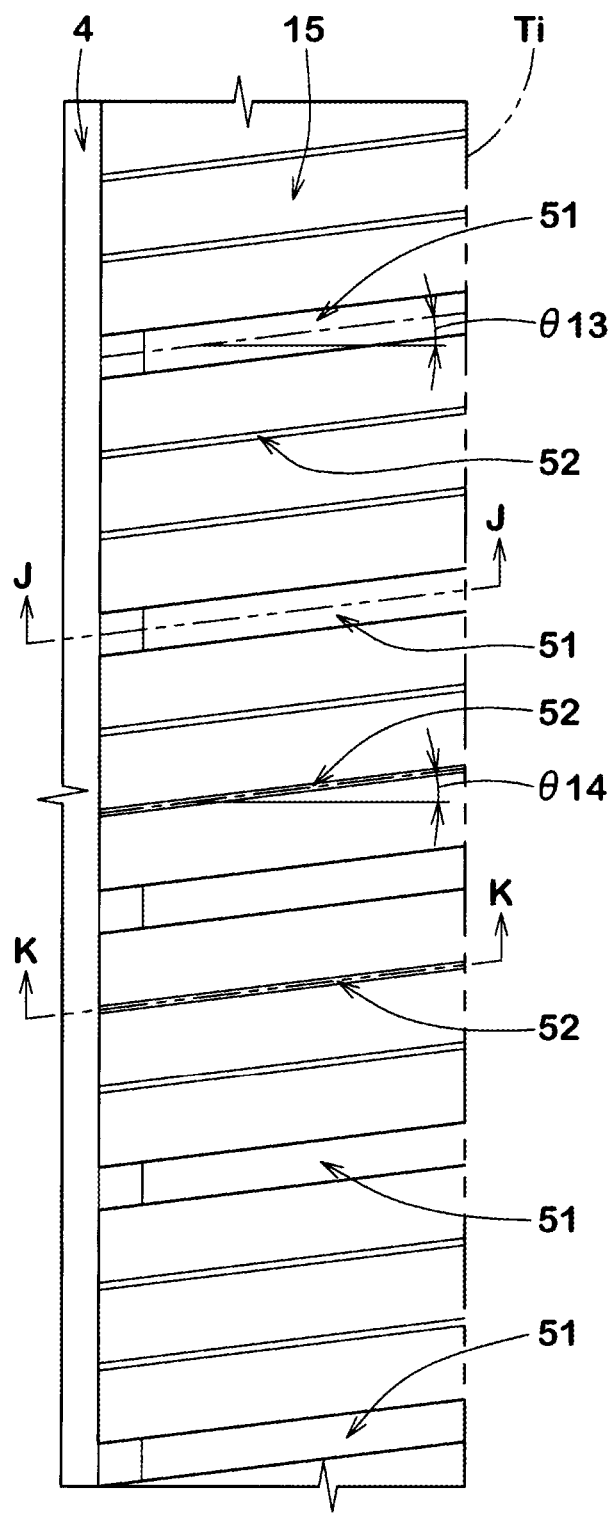
FIG. 12 is an enlarged view of a fifth land portion of FIG. 1.

FIG. 12 illustrates an enlarged view of the fifth land portion 15. As illustrated in FIG. 12, in the fifth land portion 15, multiple seventh transverse grooves 51 and multiple sixth sipes 52 are provided.

Each of the seventh transverse grooves 51 extends, for example, from the inner-side shoulder main groove 4 to the inner-side tread edge (Ti). The seventh transverse grooves 51 each linearly extend inclined, for example, in a second direction with respect to the tire axial direction. The seventh transverse grooves 51 are desirably each inclined, for example, at an angle (θ13) of 5-15 degrees with respect to the tire axial direction.

Figure 13A:
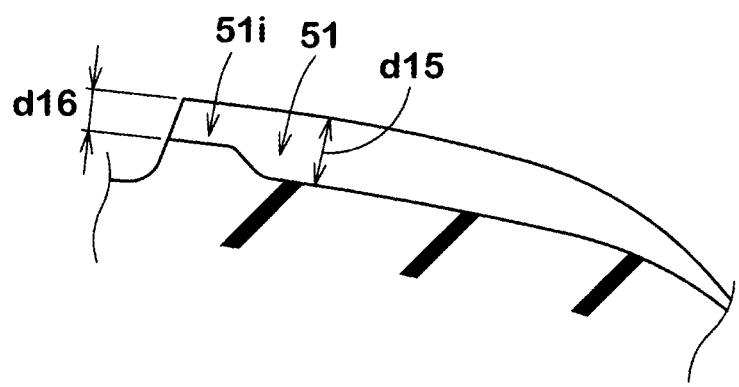
FIG. 13A is a cross-sectional view along a J-J line of FIG. 12.

FIG. 13A illustrates a cross-sectional view of one of the seventh transverse grooves 51 along a J-J line. As illustrated in FIG. 13A, in each of the seventh transverse grooves 51, for example, a bottom surface is desirably raised at a tire axial direction inner end portion (51i). The inner end portion (51i) desirably has a depth (d16), for example, of 0.60-0.80 times a maximum depth (d15) of the seventh transverse grooves 51.

As illustrated in FIG. 12, the sixth sipes 52 are each provided, for example, between seventh transverse grooves 51 that are adjacent to each other in the tire circumferential direction. In the present embodiment, multiple sixth sipes 52 are provided between the seventh transverse grooves 51.

The sixth sipes 52 each linearly extend, for example, from the inner-side shoulder main groove 4 to the inner-side tread edge (Ti). The sixth sipes 52 are each inclined, for example, in a second direction with respect to the tire axial direction. The sixth sipes 52 are desirably each inclined, for example, at an angle (θ14) of 5-15 degrees with respect to the tire axial direction. In desirable mode, the sixth sipes 52 are arranged, for example, parallel to the seventh transverse grooves 51.

Figure 13B:
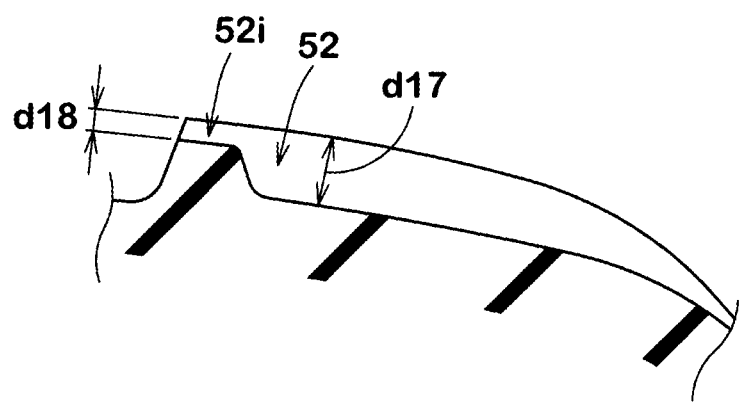
FIG. 13B is cross-sectional view along a K-K line of FIG. 12.

FIG. 13B illustrates a cross-sectional view of one of the sixth sipes 52 along a K-K line. As illustrated in FIG. 13B, in each of the sixth sipes 52, for example, a bottom surface is desirably raised at a tire axial direction inner end portion (52i). The inner end portion (52i) desirably has a depth (d18), for example, of 0.20-0.40 times a maximum depth (d17) of the sixth sipes 52. Such sixth sipes 52, together with the above-described seventh transverse grooves 51, increase rigidity of the fifth land portion 15 on a tire axial direction inner side, and thus the steering stability on a dry road surface is improved. In the above, the tire of an embodiment of the present invention is described in detail. However, without being limited to the above-described specific embodiment, the present invention can also be embodied in various modified forms.

EXAMPLES

Figure 14:
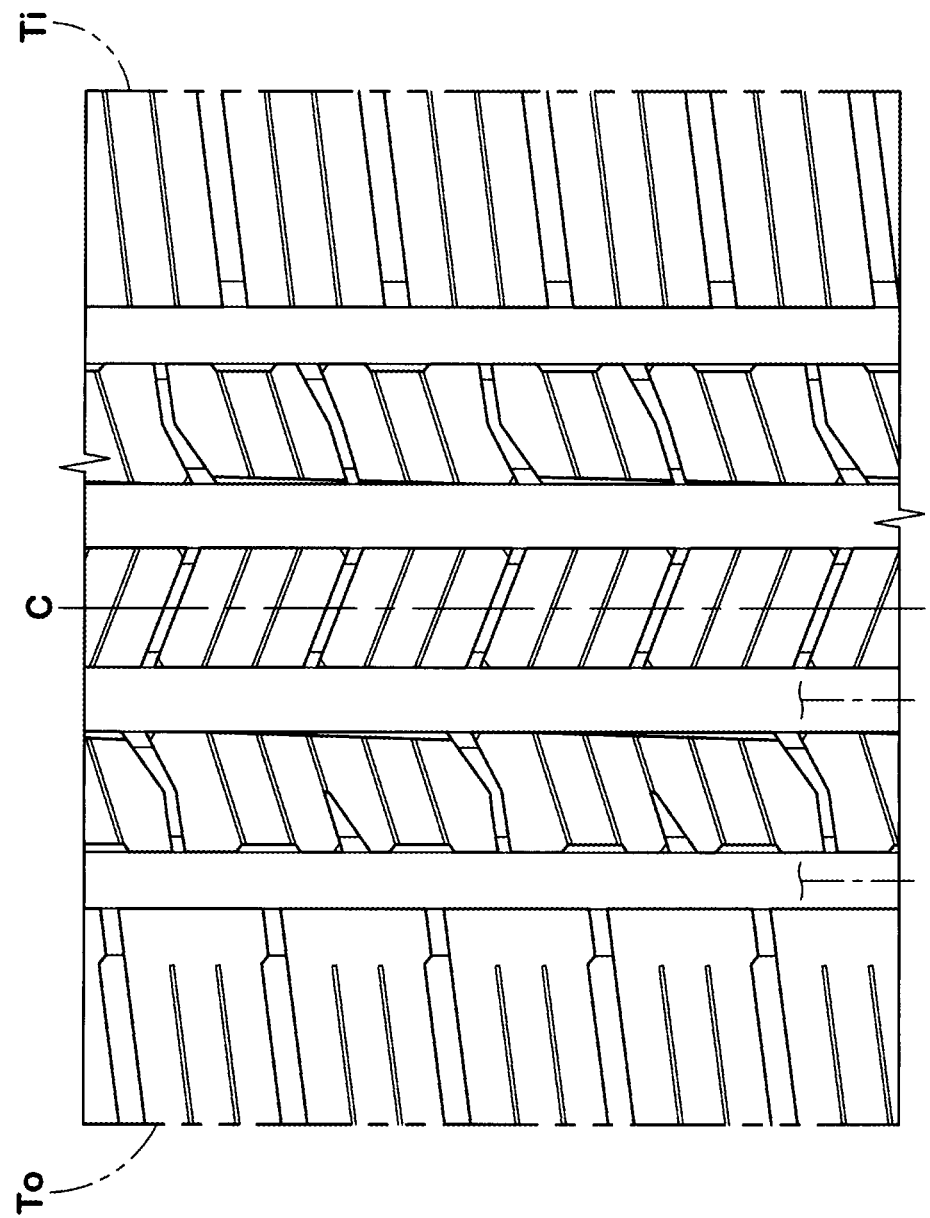
FIG. 14 is a developed view of a tread part of a tire of a comparative example.

Tires of size 245/60R18 each having the basic pattern of FIG. 1 are prototyped based on specifications shown in Table 1. As a comparative example, a tire is prototyped in which, as illustrated in FIG. 14, slots are not provided in the first blocks, and two sipes completely extending across each block are provided. For each of the test tires, steering stability on a dry road surface and performance on snow and ice are tested. Specifications and a test method of the test tires are as follows.

Mounting rim: 18×6.5 J

Tire internal pressure: 220 kPa

Test vehicle: 44-wheel drive car, displacement: 2400 cc

Tire mounting positions: all wheels

Steering Stability on Dry Road Surface

When the test vehicle is driven on a dry road surface, steering stability including handle responsiveness, rigidity feeling, grip feeling and the like is evaluated by the driver based on a sensory evaluation. The results are scores with a result of the comparative example as 100. A larger score indicates a better steering stability.

Performance on Snow and Ice

When the test vehicle is driven on an icy and snowy road surface with snow and ice thereon, performances such as handle responsiveness, acceleration, braking feeling, and gripping performance are evaluated by the driver based on a sensory evaluation. The results are scores with a result of the comparative example as 100. A larger score indicates a better performance.

The test results are shown in Table 1.

TABLE 1

|  | Comparative Example 1 | Example 1 | Example 2 | Example 3 | Example 4 | Example 5 | Example 6 |
|---|---|---|---|---|---|---|---|
| Figure showing tread pattern | FIG. 14 | FIG. 1 | FIG. 1 | FIG. 1 | FIG. 1 | FIG. 1 | FIG. 1 |
| (maximum depth d4 of first sipe and second sipe)/(depth of main grooves) | — | 0.76 | 0.50 | 0.80 | 0.90 | 0.80 | 0.80 |
| (length L7 of first sipe and second sipe)/(width W4 of first block) | — | 0.54 | 0.30 | 0.50 | 0.50 | 0.70 | 0.80 |
| Shortest distance L15 (mm) from first sipe or second sipe to first transverse groove | — | 10 | 5 | 10 | 10 | 5 | 15 |
| Arrangement of first sipe and second sipe | — | Parallel | Parallel | Parallel | Non-parallel | Parallel | Parallel |
| Steering stability on dry road surface (score) | 100 | 105 | 105 | 104 | 103 | 104 | 103 |
| Performance on snow and ice (score) | 100 | 106 | 104 | 105 | 103 | 106 | 105 |

|  | Example 7 | Example 8 | Example 9 | Example 10 | Example 11 | Example 12 | Example 13 |
|---|---|---|---|---|---|---|---|
| Figure showing tread pattern | FIG. 1 | FIG. 1 | FIG. 1 | FIG. 1 | FIG. 1 | FIG. 1 | FIG. 1 |
| (maximum depth d4 of first sipe and second sipe)/(depth of main grooves) | 0.50 | 0.80 | 0.76 | 0.76 | 0.76 | 0.76 | 0.76 |
| (length L7 of first sipe and second sipe)/(width W4 of first block) | 0.54 | 0.54 | 0.30 | 0.70 | 0.54 | 0.54 | 0.54 |
| Shortest distance L15 (mm) from first sipe or second sipe to first transverse groove | 10 | 10 | 10 | 10 | 5 | 15 | 10 |
| Arrangement of first sipe and second sipe | Parallel | Parallel | Parallel | Parallel | Parallel | Parallel | Non-parallel |
| Steering stability on dry road surface (score) | 105 | 105 | 105 | 104 | 103 | 105 | 103 |
| Performance on snow and ice (score) | 104 | 106 | 104 | 106 | 107 | 104 | 104 |

As a result of the test, it can be confirmed that the tires of the examples exhibit excellent steering stability and performance on snow and ice.

The tire described in Japanese Patent Laid-Open Publication No. HEI 5-229310 has a slot provided on a side surface of a block and a sipe extending from the slot in order to improve steering stability and performance on snow and ice. However, the sipe of Japanese Patent Laid-Open Publication No. HEI 5-229310 completely extends across the block and tends to lower the rigidity of the block. Therefore, the tire of Japanese Patent Laid-Open Publication No. HEI 5-229310 has room for further improvement in steering stability and performance on snow and ice.

A tire according to an embodiment of the present invention achieves excellent steering stability and performance on snow and ice.

A tire according to an embodiment of the present invention includes a tread part that includes: multiple main grooves that each linearly continuously extend in a tire circumferential direction; and a first land portion that is formed by dividing the tread part by the main grooves. The first land portion includes: multiple first transverse grooves that each extend inclined in a first direction with respect to a tire axial direction and each completely extend across the first land portion; and multiple first blocks that are formed by dividing the first land portion by the first transverse grooves. At least one of the first blocks is provided with: a first slot that extends from a first side surface on one side in the tire axial direction; a second slot that extends from a second side surface on the other side in the tire axial direction; a first sipe that extends from the first slot and terminates within the first block; and a second sipe that extends from the second slot and terminates within the first block without intersecting the first sipe.

In a tire according to an embodiment of the present invention, it is desirable that the first sipe and the second sipe are each inclined in a second direction opposite to the first direction with respect to the tire axial direction.

In a tire according to an embodiment of the present invention, it is desirable that the first sipe and the second sipe extend in parallel to each other.

In a tire according to an embodiment of the present invention, it is desirable that the first sipe and the second sipe are each inclined at an angle smaller than that of the first transverse grooves with respect to the tire axial direction.

In a tire according to an embodiment of the present invention, it is desirable that the first sipe and the second sipe each extend across a center line that bisects a tire axial direction width of the first block.

On the center line of a tire according to an embodiment of the present invention, it is desirable that a distance between the first sipe and the second sipe is larger than a distance between the first sipe and a nearest neighboring first transverse groove of the first sipe, and larger than a distance between the second sipe and a nearest neighboring first transverse groove of the second sipe.

In a tire according to an embodiment of the present invention, it is desirable that the first slot and the second slot each include: a longitudinal edge that extends along the tire circumferential direction; a pair of transverse edges that respectively extend from ends of the longitudinal edge to the main groove side; and corners that respectively connect the longitudinal edge to the transverse edges, the first sipe is connected to one of the corners of the first slot, and the second sipe is connected to one of the corners of the second slot.

In a tire according to an embodiment of the present invention, it is desirable that the first sipe and the second sipe each have a maximum depth of 0.50-0.80 times that of the main grooves.

In a tire according to an embodiment of the present invention, it is desirable that at least one tire axial direction end portion of each of the first transverse grooves has a depth smaller than that of a tire axial direction center portion of each of the first transverse grooves, and the first slot and the second slot each have a depth larger than that of the end portion of each of the first transverse grooves.

In a tire according to an embodiment of the present invention, it is desirable that the tread part includes a second land portion formed by dividing the tread part by the main grooves, the second land portion is provided with multiple second transverse grooves and multiple third transverse, the multiple second transverse grooves and the multiple third transverse grooves each completely extending across the second land portion, the second transverse grooves are each bent in a V shape, and the third transverse grooves each include: a constant width portion extending with a constant groove width; and a widened portion having a groove width that is gradually increased toward an end side of the groove.

In a tire according to an embodiment of the present invention, it is desirable that the tread part has an asymmetric tread pattern with respect to a tire equator.

In a tire according to an embodiment of the present invention, it is desirable that the tread part includes, by specifying an orientation for mounting the tire on a vehicle: an outer-side tread edge that is positioned on an outer side of the vehicle when the tire is mounted on the vehicle; and an inner-side tread edge that is positioned on an inner side of the vehicle when the tire is mounted on the vehicle, the main grooves include: an outer-side shoulder main groove that is arranged on outermost tread edge side; an inner-side shoulder main groove that is arranged on an innermost tread edge side; an outer-side crown main groove that is arranged between the outer-side shoulder main groove and the tire equator; and an inner-side crown main groove that is arranged between the inner-side shoulder main groove and the tire equator, and the first land portion is formed between the outer-side crown main groove and the inner-side crown main groove.

The first land portion of a tire according to an embodiment of the present invention includes the multiple first transverse grooves that each extend inclined in the first direction with respect to the tire axial direction and each completely extend across the first land portion, and the multiple first blocks formed by dividing the first land portion by the first transverse grooves. At least one of the first blocks is provided with the first slot that extends from the first side surface on the one side in the tire axial direction, the second slot that extends from the second side surface on the other side in the tire axial direction, the first sipe that extends from the first slot and terminates within the first block, and the second sipe that extends from the second slot and terminates within the first block without intersecting the first sipe.

In a tire according to an embodiment of the present invention, the slots can strongly compress snow and achieve a large snow column shearing force. Further, since the sipes respectively extend from the slots, the slots appropriately deform during running of the tire and snow in the slots is promptly discharged to the outside of the tire. Therefore, the above-described effect can be maintained over a long period of time. The first sipe and the second sipe respectively extend from the slots and thus are easier to open than ordinary sipes, and, for example, a whole edge of each of the sipes tends to be in close contact with a road surface according to unevenness of the road surface. Therefore, a tire according to an embodiment of the present invention can expect a high frictional force due to the edges of the sipes, for example, on a road surface where snow has been strongly compressed or on an icy road surface. Further, the first sipe and the second sipe terminate within the first block without intersecting each other. Therefore, a decrease in the rigidity of the first block is suppressed and excellent steering stability is obtained.

What is claimed is:

1. A tire, comprising:
a tread part having a plurality of main grooves each linearly continuously extending in a tire circumferential direction such that a first land portion is formed between the main grooves, and a plurality of shoulder main grooves each linearly continuously extending in the tire circumferential direction such that an outer-side shoulder land portion is formed between an outermost tread edge and an outer-side shoulder main groove of the shoulder main grooves and that an inner-side shoulder land portion is formed between an innermost tread edge and an inner-side shoulder main groove of the shoulder main grooves,
wherein the first land portion has a plurality of first transverse grooves such that each of the first transverse grooves is linearly extending inclined in a first direction with respect to a tire axial direction and completely across the first land portion, and a plurality of first blocks formed between the first transverse grooves such that at least one of the first blocks has a first slot extending from a first side surface of the one of the first blocks on one side in the tire axial direction, a second slot extending from a second side surface of the one of the first blocks on an opposite side in the tire axial direction, a first sipe linearly extending from the first slot and terminating within the one of the first blocks, and a second sipe linearly extending from the second slot and terminating within the one of the first blocks without intersecting the first sipe, each of the first sipe and the second sipe is inclined in a second direction opposite to the first direction with respect to the tire axial direction, the tread part has an asymmetric tread pattern with respect to a tire equator such that the outer-side shoulder land portion includes a plurality of transverse grooves extending from the outer-side main groove to the outer-side tread edge, and a plurality of sipes extending from the outer-side tread edge toward the outer-side main groove and terminating within the outer-side shoulder land portion, and that the inner-side shoulder land portion includes a plurality of transverse grooves extending from the inner-side main groove to the inner-side tread edge, and a plurality of sipes extending from the inner-side tread edge to the inner-side main groove, and each of the first sipe and the second sipe is inclined in a second direction opposite to the first direction with respect to the tire axial direction.

2. The tire according to claim 1, wherein the outer-side shoulder land portion is formed such that each of the sipes formed in the outer-side shoulder land portion has a tire axial direction length in a range of 0.70 to 0.80 times a tire axial direction width of the outer-side shoulder land portion.

3. The tire according to claim 1, wherein the outer-side shoulder land portion is formed such that each of the sipes formed in the outer-side shoulder land portion is inclined at an angle in a range of 5 to 15 degrees with respect to the tire axial direction, and the inner-side shoulder land portion is formed such that each of the sipes formed in the inner-side shoulder land portion is inclined at an angle in a range of 5 to 15 degrees with respect to the tire axial direction.

4. A tire, comprising:
a tread part having a plurality of main grooves each linearly continuously extending in a tire circumferential direction, and a first land portion formed between the main grooves,
wherein the first land portion has a plurality of first transverse grooves such that each of the first transverse grooves is linearly extending and inclined in a first direction with respect to a tire axial direction and completely across the first land portion, and a plurality of first blocks formed between the first transverse grooves such that at least one of the first blocks has a first slot extending from a first side surface of the one of the first blocks on one side in the tire axial direction, a second slot extending from a second side surface of the one of the first blocks on an opposite side in the tire axial direction, a first sipe linearly extending from the first slot and terminating within the one of the first blocks, and a second sipe linearly extending from the second slot and terminating within the one of the first blocks without intersecting the first sipe, and each of the first sipe and the second sipe is inclined in a second direction opposite to the first direction with respect to the tire axial direction.

5. The tire according to claim 4, wherein the first sipe and the second sipe extend in parallel to each other.

6. The tire according to claim 4, wherein each of the first sipe and the second sipe is inclined at an angle smaller than an angle of the first transverse grooves with respect to the tire axial direction.

7. The tire according to claim 4, wherein the first land portion is formed such that each of the first transverse grooves is inclined at an angle in a range of 15 to 20 degrees with respect to the tire axial direction.

8. The tire according to claim 4, wherein the first land portion is formed such that each of the first sipe and the second sipe is inclined at an angle in a range of 5 to 10 degrees with respect to the tire axial direction.

9. The tire according to claim 4, wherein each of the first sipe and the second sipe extends across a center line bisecting a tire axial direction width of the first block.

10. The tire according to claim 9, wherein on the center line, the one of the first blocks is formed such that a distance between the first sipe and the second sipe is larger than a distance between the first sipe and one of the first transverse grooves nearest to the first sipe, and larger than a distance between the second sipe and one of the first transverse grooves nearest to the second sipe.

11. A tire, comprising:
a tread part having a plurality of main grooves each linearly continuously extending in a tire circumferential direction, and a first land portion formed between the main grooves,
wherein the first land portion has a plurality of first transverse grooves such that each of the first transverse grooves is linearly extending and inclined in a first direction with respect to a tire axial direction and completely across the first land portion, and a plurality of first blocks formed between the first transverse grooves such that at least one of the first blocks has a first slot extending from a first side surface of the one of the first blocks on one side in the tire axial direction, a second slot extending from a second side surface of the one of the first blocks on an opposite side in the tire axial direction, a first sipe linearly extending from the first slot and terminating within the one of the first blocks, and a second sipe linearly extending from the second slot and terminating within the one of the first blocks without intersecting the first sipe, the first slot is formed such that the first slot has a tire circumferential direction length in a range of 0.25 to 0.35 times a tire circumferential direction length of the first side surface, and a tire axial direction width in a range of 0.05 to 0.15 times a tire axial direction width of the one of the first blocks, the second slot is formed such that the second slot has a tire circumferential direction length in a range of 0.25 to 0.35 times a tire circumferential direction length of the second side surface, and a tire axial direction width in a range of 0.05 to 0.15 times a tire axial direction width of the one of the first blocks, and each of the first sipe and the second sipe is inclined in a second direction opposite to the first direction with respect to the tire axial direction.

12. The tire according to claim 11, wherein each of the first slot and the second slot has a longitudinal edge extending along the tire circumferential direction, a pair of transverse edges extending from ends of the longitudinal edge to a respective one of the main grooves, and a plurality of corners connecting the longitudinal edge to the transverse edges, the first sipe is connected to one of the corners of the first slot, and the second sipe is connected to one of the corners of the second slot.

13. The tire according to claim 11, wherein each of the first sipe and the second sipe has a maximum depth in a range of 0.50 to 0.80 times a maximum depth of the main grooves.

14. The tire according to claim 11, wherein each of the first transverse grooves has at least one tire axial direction end portion having a depth that is smaller than a depth of a tire axial direction center portion of each of the first transverse grooves, and each of the first slot and the second slot has a depth that is larger than a depth of the end portion of each of the first transverse grooves.

15. The tire according to claim 11, wherein the tread part has a second land portion formed between the main grooves, the second land portion has a plurality of second transverse grooves and a plurality of third transverse grooves formed such that the second transverse grooves and the third transverse grooves are completely extending across the second land portion, each of the second transverse grooves is bent in a V shape, and each of the third transverse grooves includes a constant width portion extending with a constant groove width, and a widened portion having a groove width that is gradually increasing toward an end side of a respective one of the third transverse grooves.

16. The tire according to claim 11, wherein the tread part has an asymmetric tread pattern with respect to a tire equator.

17. The tire according to claim 11, wherein the tread part has an outer-side tread edge formed on an outer side of a vehicle when the tire is mounted on the vehicle, and an inner-side tread edge formed on an inner side of the vehicle when the tire is mounted on the vehicle, the plurality of main grooves includes an outer-side shoulder main groove formed on an outermost tread edge side, an inner-side shoulder main groove formed on an innermost tread edge side, an outer-side crown main groove formed between the outer-side shoulder main groove and the tire equator, and an inner-side crown main groove formed between the inner-side shoulder main groove and the tire equator, and the first land portion is formed between the outer-side crown main groove and the inner-side crown main groove.

18. The tire according to claim 11, wherein the first and second slots are formed such that each of the first and second slots has a tire circumferential direction width gradually decreasing toward a center of the one of the first blocks.

19. The tire according to claim 11, wherein each of the first sipe and the second sipe extends across a center line bisecting a tire axial direction width of the first block.

20. The tire according to claim 19, wherein on the center line, the one of the first blocks is formed such that a distance between the first sipe and the second sipe is larger than a distance between the first sipe and one of the first transverse grooves nearest to the first sipe, and larger than a distance between the second sipe and one of the first transverse grooves nearest to the second sipe.

* * * * *